(12) United States Patent
Yoon et al.

(10) Patent No.: US 11,533,200 B2
(45) Date of Patent: Dec. 20, 2022

(54) WIRELESS COMMUNICATION DEVICE AND CHANNEL ESTIMATION METHOD THEREOF

(71) Applicant: SAMSUNG ELECTRONICS CO., LTD., Suwon-si (KR)

(72) Inventors: Hongsik Yoon, Seongnam-si (KR); Jungmin Park, Seoul (KR); Jinho Kim, Seoul (KR); Youngseok Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 23 days.

(21) Appl. No.: 17/039,709

(22) Filed: Sep. 30, 2020

(65) Prior Publication Data

US 2021/0266198 A1 Aug. 26, 2021

(30) Foreign Application Priority Data

Feb. 25, 2020 (KR) .................. 10-2020-0023005

(51) Int. Cl.
*H04L 25/02* (2006.01)
*H04W 72/04* (2009.01)
*H04L 5/00* (2006.01)

(52) U.S. Cl.
CPC ........ *H04L 25/0224* (2013.01); *H04L 5/0048* (2013.01); *H04W 72/0453* (2013.01)

(58) Field of Classification Search
CPC .................. H04L 25/0224; H04W 72/0453
See application file for complete search history.

(56) References Cited

U.S. PATENT DOCUMENTS

| | | | |
|---|---|---|---|
| 7,801,232 B2 | 9/2010 | Sung | |
| 9,356,808 B2 | 5/2016 | Damji et al. | |
| 9,426,013 B2 | 8/2016 | Laroia et al. | |
| 9,479,218 B2* | 10/2016 | Li | H04B 17/20 |
| 9,806,784 B2 | 10/2017 | Zhang | |
| 10,182,356 B2 | 1/2019 | Ko et al. | |
| 10,212,715 B2 | 2/2019 | Sihlbom | |
| 2007/0161361 A1* | 7/2007 | Vaisanen | H04L 25/03159 |
| | | | 455/302 |
| 2007/0189149 A1* | 8/2007 | Terabe | H04L 25/0232 |
| | | | 370/208 |
| 2008/0112386 A1* | 5/2008 | Ogawa | H04L 25/0228 |
| | | | 370/345 |

(Continued)

FOREIGN PATENT DOCUMENTS

KR 10-2017-0073444 6/2017

*Primary Examiner* — Zhiren Qin
(74) *Attorney, Agent, or Firm* — F. Chau & Associates, LLC

(57) ABSTRACT

The present disclosure relates to a channel estimation method of a wireless communication device. The channel estimation method includes descrambling a pilot signal having a unit symbol, dividing the descrambled pilot signal, and estimating a channel value of the wireless communication device. The descrambled pilot signal may be divided into a plurality of frequency resources with a first frequency resource and a second frequency resource and generating a first signal chunk with the first frequency resource and a second signal chunk with the second frequency resource. The channel value of the wireless communication device may be estimated based on the first signal chunk and the second signal chunk.

18 Claims, 13 Drawing Sheets

(56) References Cited

U.S. PATENT DOCUMENTS

| | | | |
|---|---|---|---|
| 2009/0252026 A1* | 10/2009 | Yousef | H04L 27/2665 |
| | | | 370/210 |
| 2012/0114085 A1* | 5/2012 | Kim | H04L 25/022 |
| | | | 375/346 |
| 2013/0330082 A1* | 12/2013 | Perez De Aranda Alonso | H04B 10/25 |
| | | | 398/98 |
| 2018/0278438 A1* | 9/2018 | Jung | H04L 25/0222 |
| 2019/0229962 A1* | 7/2019 | Peng | H04L 27/2613 |
| 2020/0028642 A1* | 1/2020 | He | H04W 72/04 |
| 2020/0396020 A1* | 12/2020 | Wang | H04L 1/0057 |
| 2021/0258902 A1* | 8/2021 | Gao | H04J 11/0073 |

\* cited by examiner

WIRELESS COMMUNICATION DEVICE AND CHANNEL ESTIMATION METHOD THEREOF

CROSS-REFERENCE TO RELATED APPLICATION

This application claims the benefit of Korean Patent Application No. 10-2020-0023005, filed on Feb. 25, 2020, in the Korean Intellectual Property Office, the disclosure of which is incorporated by reference herein in its entirety.

BACKGROUND

The inventive concept relates to wireless communication, and more particularly, to a wireless communication device performing a channel estimation operation and a channel estimation method thereof.

A wireless communication device is device that uses electromagnetic waves, such as radio waves, to transfer information such as text, voice, or data. Mobile phones, walkie-talkies, and GPS units are examples of wireless communication devices. Wireless channels are used in wireless communication devices to send and receive data. For example, a wireless channel may represent a portion of a frequency band.

In a wireless communication environment, the state of the wireless channel (i.e., its suitability for supporting wireless communication) may change or be distorted. Thus, in some cases a receiver may regularly perform a channel estimation procedure to determine the state of the channel (and therefore, how much incoming signals are distorted). The receiver then decodes received signals based on the estimated channel value.

The 5th generation new radio (5G NR) standard supports a wider system bandwidth and a more flexible communication scenario than other communication standards such as the long term evolution (LTE) standard. Therefore, the number of pilot signals used for channel estimation may increase. Furthermore, the number of pilot signals having the same precoding may be reduced. As the system bandwidth increases and patterns of the pilot signals become smaller, the size and complexity of Fourier transform (FT) and inverse Fourier transform (IFT) operations may increase. Therefore, there is a need in the art for a wireless communication device capable of reducing the size and complexity of FT and IFT operations.

SUMMARY

The inventive concept relates to a wireless communication device capable of reducing sizes of Fourier transform (FT) and inverse Fourier transform (IFT) operations by dividing and estimating portions of a wireless channel. The systems and methods described herein also include channel estimation methods that incorporate the reduced FT and IFT operations.

According to an aspect of the inventive concept, there is provided a channel estimation method of a wireless communication device, including descrambling a pilot signal; dividing the descrambled pilot signal into a plurality of frequency resources including a first frequency resource and a second frequency resource; generating a first signal chunk including the first frequency resource and a second signal chunk including the second frequency resource; and estimating a channel value of the wireless communication device based on the first signal chunk and the second signal chunk.

According to an aspect of the inventive concept, there is provided a wireless communication device performing channel estimation, including a channel estimator configured to: divide a pilot signal received through a downlink channel into a plurality of frequency resources; generate a plurality of signal chunks including the plurality of frequency resources; and estimate a channel between a base station and a terminal based on the plurality of signal chunks.

According to an aspect of the inventive concept, there is provided a wireless communication device performing channel estimation, including a channel estimator configured to: descramble a pilot signal; divide the descrambled pilot signal into a plurality of frequency resources including a first frequency resource and a second frequency resource; generate a first signal chunk including the first frequency resource and a second signal chunk including the second frequency resource; and estimate a channel value of the wireless communication device based on the first signal chunk and the second signal chunk.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

The present disclosure relates generally to a channel estimation method of a wireless communication device.

More particularly, embodiments of the disclosure relate to a wireless communication device capable of reducing sizes of a Fourier transform (FT) and an inverse FT (IFT). Some embodiments partially divide and estimate a wireless channel.

A pilot signal (also referred to as a reference signal) is used to estimate the state of a wireless channel. In some communication standards Fourier transform and inverse Fourier transform are used for transforming the pilot signal into a frequency domain. In some cases, a discontinuous demodulated reference signal (DMRS) may be used by some manufacturers. However the use of a discontinuous DMRS may increase the complexity or difficulty of denoising a pilot signal. This can increase the complexity, or reduce the efficiency of channel estimation procedures.

According to embodiments of the present disclosure, a channel estimation procedure may include a number of steps including descrambling a pilot signal, dividing the descrambled pilot signal, and estimating a channel value of the wireless communication device based on the descrambled pilot signal. In some examples, the descrambled pilot signal is divided into a plurality of frequency resources, thereby producing a first signal chunk corresponding to a first frequency resource and a second signal chunk corresponding to a second frequency resource. The channel value of the wireless communication device may then be estimated based on the first signal chunk and the second signal chunk.

Therefore, the size of the frequency resource that is being processed for each chunk is reduced (i.e., since frequency bandwidths of the plurality of signal chunks are less than a frequency bandwidth of the pilot signal). Accordingly, the FT size (or IFT size) may be reduced, and the size and complexity of the denoising operation may also be reduced.

Hereinafter, embodiments of the inventive concept will be described in detail with reference to the accompanying drawings.

Figure 1:
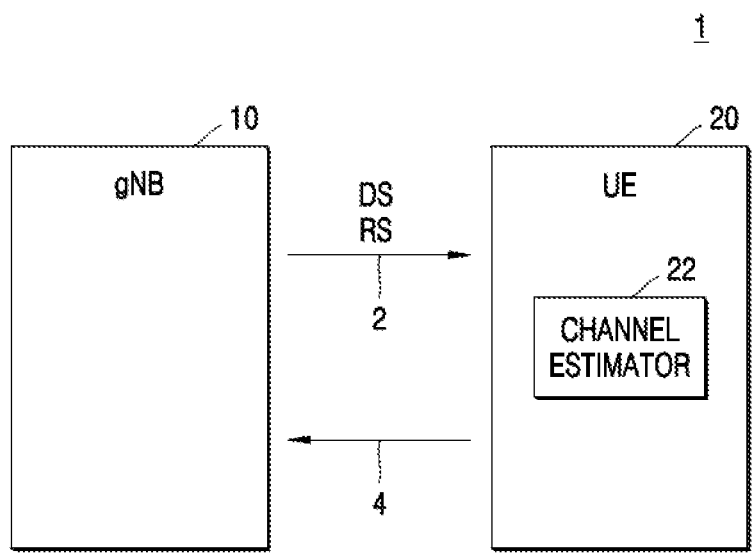
FIG. 1 is a block diagram illustrating a wireless communication system according to an exemplary embodiment of the inventive concept.

FIG. 1 is a block diagram illustrating a wireless communication system 1 according to an exemplary embodiment of the inventive concept.

Referring to FIG. 1, the wireless communication system 1 may include a base station 10 and a terminal 20. The terminal 20 may be positioned in a cell coverage of the base station 10. The base station 10 and the terminal 20 may communicate with each other through a downlink channel 2 and an uplink channel 4. When the base station 10 and the terminal 20 communicate with each other through the downlink channel 2, the base station 10 and the terminal 20 may respectively correspond to a wireless transmitter and a wireless receiver. When the base station 10 and the terminal 20 communicate with each other through the uplink channel 4, the base station 10 and the terminal 20 may respectively correspond to a wireless receiver and a wireless transmitter.

The base station 10 may refer to a fixed station communicating with the terminal 20 and/or another base station and may transmit and receive data and/or control information by communicating with the terminal 20 and/or another base station. For example, the base station 10 may be referred to as a new radio (NR) access technology node, a node B, an evolved-node B (eNB), a next generation-node B (gNB), a base transceiver system (BTS), an NR base station (BS), or an access point (AP). Additionally or alternatively, the terminal 20 may refer to one of various devices capable of transmitting and receiving data and/or control information by communicating with the base station 10. For example, the terminal 20 may be referred to as user equipment (UE), a mobile station (MS), a mobile terminal (MT), a user terminal (UT), a subscriber station (SS), a wireless device, or a portable device.

A wireless communication network between the base station 10 and the terminal 20 may support communications of a plurality of users by sharing available network resources. For example, in the wireless communication network, information may be transmitted by various methods such as code division multiple access (CDMA), frequency division multiple access (FDMA), time division multiple access (TDMA), orthogonal frequency division multiple access (OFDMA), and single carrier frequency division multiple access (SC-FDMA).

The terminal 20 may include a channel estimator 22 and the base station 10. The terminal 20 may further include at least one component used for the channel estimation operation. Each of the components included in the base station 10 and the terminal 20 may be a hardware block. The hardware block may include an analog circuit and/or a digital circuit or a software block with a plurality of instructions executed by a processor. Additionally or alternatively, each of the components included in the base station 10 and the terminal 20 may be a firmware block obtained by a combination of hardware and software.

The base station 10 may transmit a downlink signal including data to the terminal 20 through at least one antenna port. In an example embodiment, the base station 10 may transmit a multilayer through a plurality of antenna ports. The base station 10 may transmit a data signal (referred to as a data symbol) DS and a pilot signal (referred to as a reference symbol or a reference signal) RS to the terminal 20 through the downlink channel 2. For example, the base station 10 may precode the data signal DS and the pilot signal RS and may transmit the precoded signals, such as the precoded data signal DS and the precoded pilot signal RS, to the terminal 20 through the downlink channel 2.

In some cases, a communication device may perform channel estimation by generating channel state information (CSI), which refers to information describing the channel properties of a communication link. For example, CSI may describe how a signal propagates from the transmitter to the receiver and may represent the combined effects of, for example, scattering, fading, and power decay. After generating the CSI, the information may be used to adapt transmission and reception procedures to current channel conditions. This may result in improving the rate and reliability of communication, especially in multiantenna systems. In some cases, CSI is estimated at a receiver which provides feedback to the transmitter (although reverse-link estimation is also possible). In some cases, the transmitter and receiver can have different CSI.

The pilot signal RS may refer to a signal used for channel estimation of the data signal DS. In an example embodiment, the pilot signal RS may include a demodulation reference signal (DMRS) used for channel estimation of a specific terminal. In an example embodiment, the pilot signal RS may include a common reference signal (CRS) and/or a channel state information reference signal (CSI-RS). Other than the above signals, the pilot signal RS may include various kinds of signals. Hereinafter, unless otherwise noted, description will be made assuming that the pilot signal RS is a DMRS.

A 5G wireless communication method may support wireless connection among various devices to implement an Internet of things (IoT) system. For example, unlike a conventional continuous pattern of a pilot signal RS (for example, a CRS pattern), by using a discontinuous pattern of a pilot signal RS, a degree of freedom of resource allocation and efficiency of resource allocation may increase. Although precodings among pilot signals RS are performed in the same way, when the pattern of the pilot signal RS is discontinuous, a denoising technique in a conventional time-domain may not be used. Therefore, according to an exemplary embodiment of the inventive concept, the pilot signal RS may be divided into a plurality of signal chunks and a channel value may be estimated by using each of the plurality of signal chunks. As used herein, the term "chunk" may refer to a set of signal resources that are processed together. For example, a separate FT or IFT process may be performed for each of a plurality of signal chunks.

When a bandwidth of a communication system increases and the density of the pilot signal RS increases, sizes of an FT and IFT may increase and a chip size (hardware size) may increase. According to an exemplary embodiment of the inventive concept, in estimating the channel value, an entire pilot signal RS is not used and, by dividing the pilot signal RS into the plurality of signal chunks, the sizes of the FT and the IFT are reduced. Therefore, the chip size may be reduced.

Figure 2:
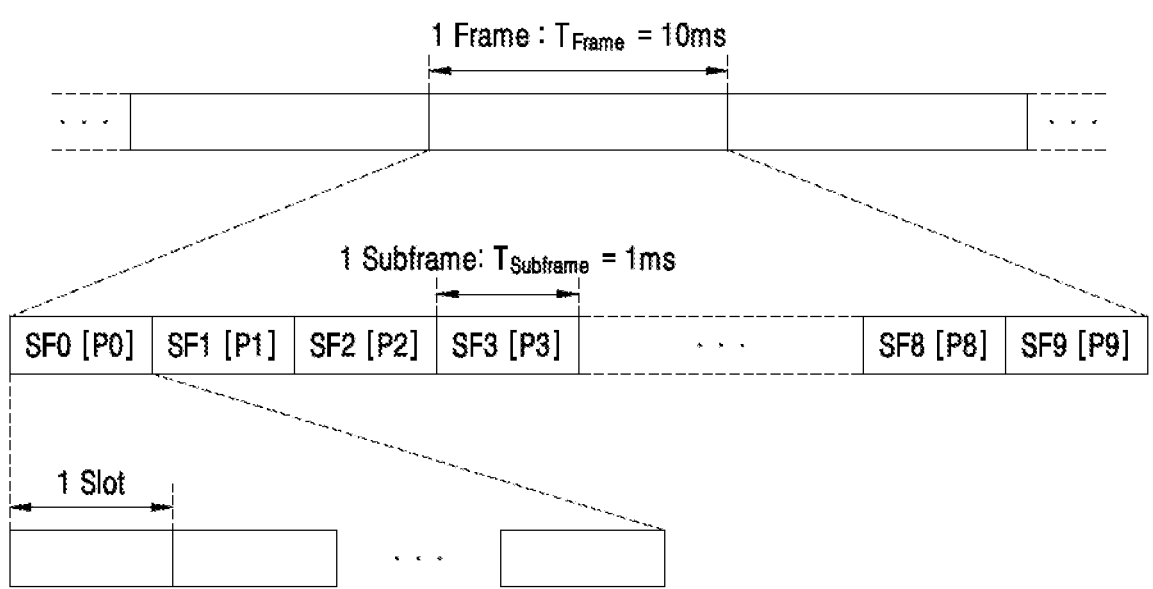
FIG. 2 illustrates an example of a frame structure of a downlink signal.

FIG. 2 illustrates an example of a frame structure of a downlink signal.

Referring to FIG. 2, the downlink signal transmitted through the downlink channel (2 of FIG. 1) may include a plurality of frames. One frame (or a radio frame) may include ten sub-frames SF0 to SF9. The terminal (20 of FIG. 1) may sequentially receive the sub-frames SF0 to SF9. The sub-frame SF0 may be received first and the sub-frame SF9 may be received last. One sub-frame may include a plurality of slots. For example, one sub-frame may include two slots. However, in a 5G-based wireless communication system, one sub-frame may include slots of which the number varies in accordance with a subcarrier bandwidth. A time to transmit one sub-frame is referred to as a transmission time interval (TTI). In a long term evolution (LTE-based communication system, a sub-frame is 1 ms and a slot is 0.5 ms. However, the structure of a wireless frame and a value of TTI may vary in accordance with a communication system.

Figure 3:
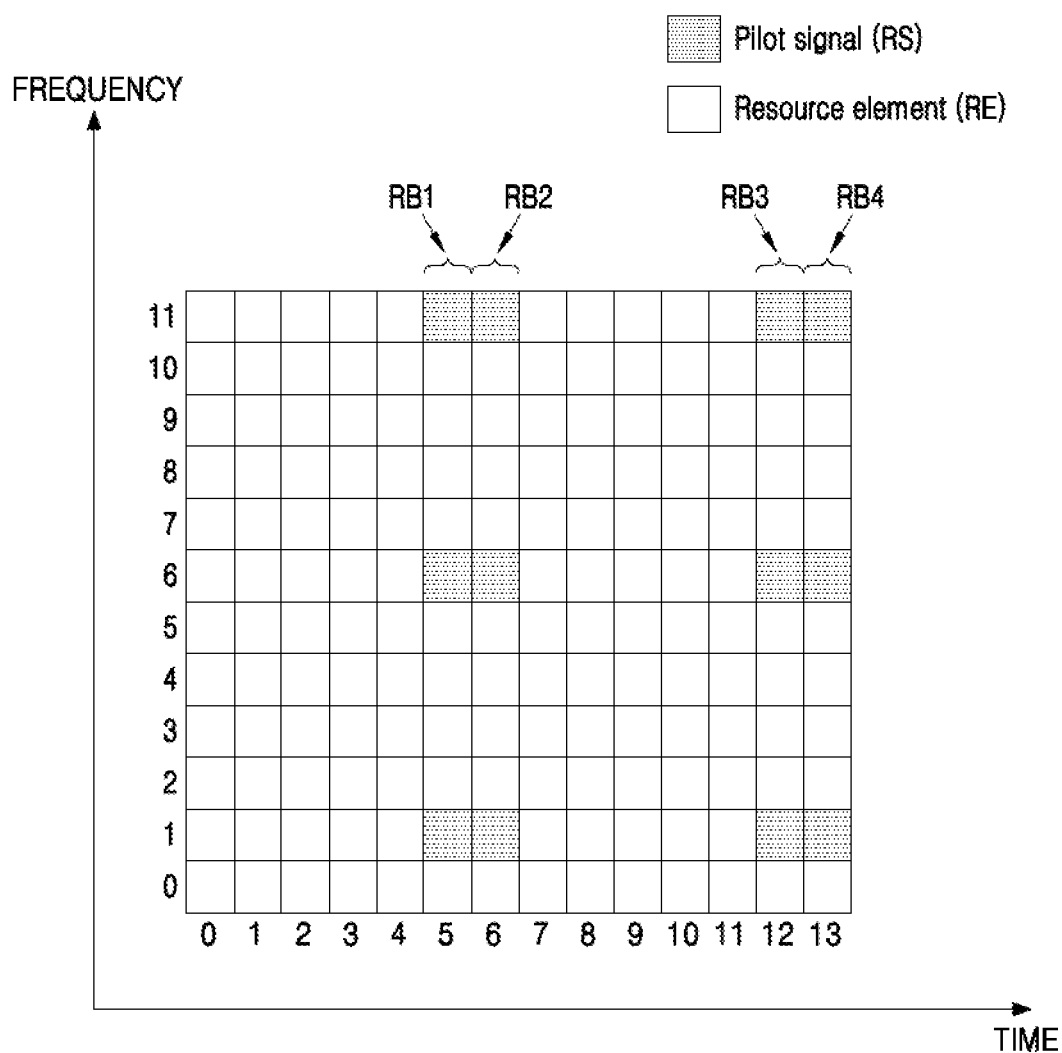
FIG. 3 illustrates a pilot signal included in a resource block.

FIG. 3 illustrates pilot signals included in resource blocks.

Referring to FIG. 3, the horizontal axis represents a time domain and the vertical axis represents a frequency domain.

In frequency-time domains, a basic unit of a resource is a resource element (RE), which may be represented by a subcarrier index and a symbol index. In the 5G-based wireless communication system, a resource block (for example, RB1) is defined as continuous subcarriers in the frequency domain and one symbol in the time domain. For example, an LTE-based wireless communication system may use 1,200 subcarriers in a 20 MHz downlink and the 5G-based wireless communication system may use more than 1,200 subcarriers. For example, the 5G-based wireless communication system may use up to 3,276 subcarriers based on Rel. 15.

Each of first to fourth resource blocks RB1 to RB4 may include a plurality of pilot signals RS. For example, the plurality of pilot signals RS included in a first resource block RB1 may have the same symbol index value (for example, 5) and may have different subcarrier index values (for example, 1, 6, and 11). The second to fourth resource blocks RB2 to RB4 are similar to the first resource block RB1.

In a 5G NR-based wireless communication system, although the base station (10 of FIG. 1) allocates a regular (or continuous) DMRS pattern, density among the pilot signals RS may increase and the sizes of the FT and the IFT may increase. Here, the DMRS pattern may be a pattern in accordance with different subcarrier index values of the pilot signals RS in the resource block (for example, RB1). Additionally or alternatively, although the base station (10 of FIG. 1) allocates an irregular (or discontinuous) DMRS pattern, (20 of FIG. 1) performing a denoising operation in the time domain may be difficult for the terminal. Therefore, the terminal (20 of FIG. 1) according to an exemplary embodiment according to the inventive concept, which will be described later with reference to FIG. 4, may perform channel estimation based on the plurality of signal chunks by dividing the pilot signal RS into the plurality of signal chunks with at least one symbol index value.

Figure 4:
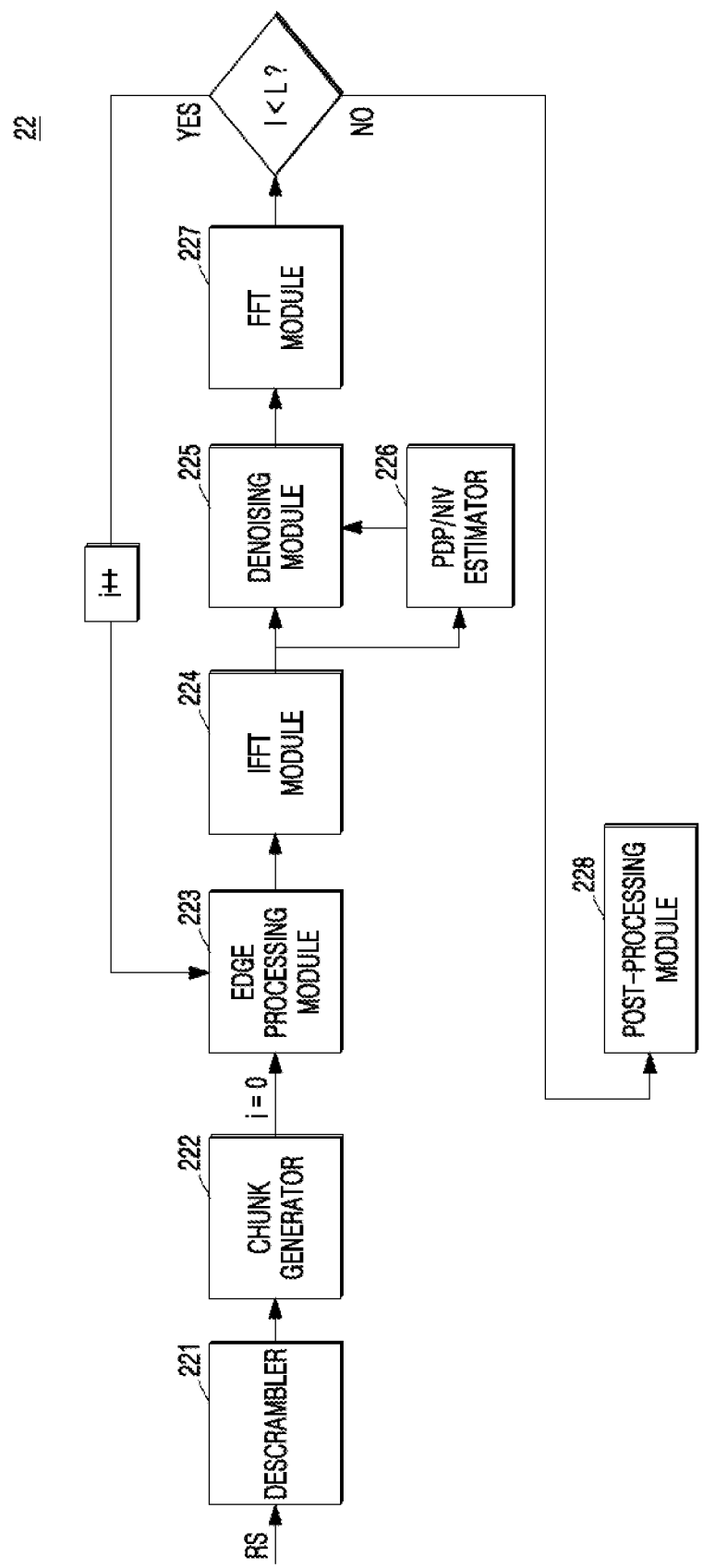
FIG. 4 is a block diagram illustrating a channel estimator according to an exemplary embodiment of the inventive concept.

FIG. 4 is a block diagram illustrating the channel estimator 22 according to an exemplary embodiment of the inventive concept.

Referring to FIG. 4, the channel estimator 22 may include a descrambler 221, a chunk generator 222, an edge processing module 223, an IFFT module 224, a denoising module 225, a PDP/NIV estimator 226, an FFT module 227, and a post-processing module 228. Each of components included in the channel estimator 22 may be a hardware block including an analog circuit and/or a digital circuit, a software block including a plurality of instructions executed by a processor, or a firmware block obtained by a combination of hardware and software.

The descrambler 221 may descramble the pilot signal RS, and the chunk generator 222 may divide the descrambled pilot signal RS into the plurality of signal chunks.

The descrambler 221 may receive the pilot signals RS, and the pilot signals RS may have a plurality of subcarrier index values of a resource block (for example, RBa).

The descrambler 221 may perform a descrambling operation for channel estimation. For example, the descrambler 221 may remove a sequence applied to the descrambled pilot signals. The descrambler 221 may remove a scrambling sequence applied to a signal transmitted from the base station (10 of FIG. 1) to the terminal (20 of FIG. 1). Each of the descrambled pilot signals may correspond to at least one resource block. Additionally or alternatively, each of the descrambled pilot signals DC1 and DC2 may correspond to at least one symbol index value and may have a plurality of subcarrier index values.

Additionally or alternatively, the descrambled pilot signal may include a plurality of resource blocks with at least one symbol index value. For example, in the 5G-based wireless communication system 1, the terminal (20 of FIG. 1) may receive a downlink signal with 273 resource blocks through a physical downlink shared channel (PDSCH) as a kind of the downlink channel (2 of FIG. 1). For example, one resource block RBa may have 12 subcarrier index values and, when a configuration of PDSCH DMRS is 1, the terminal (20 of FIG. 1) may receive a pilot signal with 273*6=1638 subcarrier index values in a specific symbol index value. Subcarrier index values of the one resource block RBa and subcarrier index values of a pilot signal by the one resource block RBa are not respectively limited to 12 and 6 and may vary in accordance with a communication method.

The descrambler 221 may output the descrambled pilot signals to the chunk generator 222. The chunk generator 222 may receive the descrambled pilot signals with a plurality of resource blocks corresponding to one symbol index value.

According to one example, a scrambling algorithm is a function that transposes, inverts or otherwise encodes data to make the data unintelligible to a receiver that is not equipped with the corresponding descrambling algorithm. The descrambling algorithm enables decoding of the data.

Whereas encryption refers to operations carried out in the digital domain, scrambling often refers to operations carried out in the analog domain. In some cases, scrambling is accomplished by the addition of components to the original signal or the changing of some important component of the original signal in order to make extraction of the original signal difficult. Examples of the latter might include removing or changing vertical or horizontal sync pulses. In some cases, scramblers are also capable of encryption devices. In some cases, a scrambler manipulates a data stream before transmission. The manipulations may be reversed by a descrambler at the receiving side. In one example, a scrambler replaces sequences into other sequences without removing undesirable sequences.

The edge processing module 223 may insert a virtual pilot signal (referred to as a virtual reference signal) into a band (hereinafter, referred to as a guard band) adjacent to a first signal chunk among the plurality of signal chunks. For example, the edge processing module 223 may generate the guard band in a frequency resource adjacent to each of the plurality of signal chunks and may insert the virtual pilot signal into the guard band. The IFFT module 224 may perform IFT on a signal chunk into which the virtual pilot signal is inserted into the time domain. The denoising module 225 may perform the denoising operation in the time domain on a signal chunk based on a power delay profile (PDP) and noise invariance (NIV) that may be estimated by the PDP/NIV estimator 226. The FFT module 227 may perform FT on the denoised signal chunk into the frequency domain. For example, the FFT module 227 may interpolate the denoised signal chunk on the frequency domain. Then, the channel estimator 22 may repeatedly perform the above-described operation on a second signal chunk to a final signal chunk (an Lth signal chunk) (L is an integer greater than 1), which will be described in detail with reference to FIG. 8.

The post-processing module 228 may determine a channel value estimation method for frequency resources overlapping among the plurality of signal chunks by performing a post-processing operation on the plurality of signal chunks. Additionally or alternatively, the post-processing module 228 may estimate values of the downlink channel (2 of FIG. 1) and/or the uplink channel (4 of FIG. 1) based on each of the plurality of signal chunks on which the post-processing operation is performed, which will be described in detail with reference to FIGS. 9A to 9C.

In the wireless communication device and the channel estimation method thereof, according to an exemplary embodiment of the inventive concept, the sizes of the FT and the IFT that may increase by estimating an entire channel at one time may be reduced. Therefore, the chip size dependent on the sizes of the FT and the IFT may be reduced.

Figure 5:
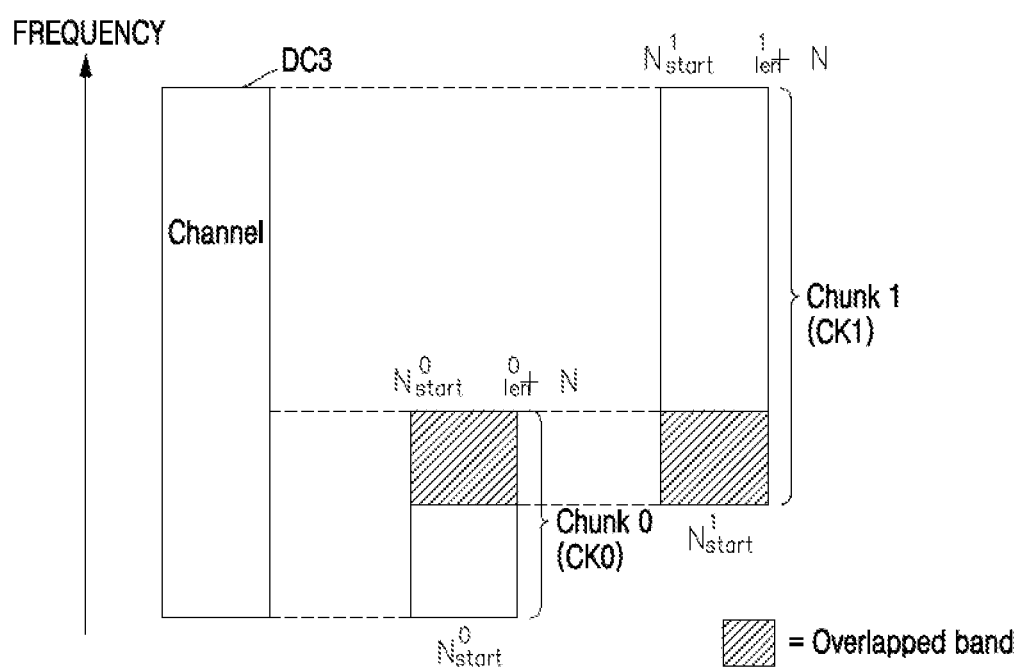
FIG. 5 illustrates a descrambling operation according to an exemplary embodiment of the inventive concept.

FIG. 5 illustrates an operation of the chunk generator 222 according to an exemplary embodiment of the inventive concept.

Referring to FIGS. 4 and 5, the chunk generator 222 may divide a descrambled pilot signal DC3 into first and second signal chunks CK0 and CK1. A symbol index value of the first and second signal chunks CK0 and CK1 may correspond to a symbol index value of the descrambled pilot signal DC3. For example, the chunk generator 222 may generate the first signal chunk CK0 with a first frequency resource (for example, $N_{len}^1$) and the second signal chunk CK1 with a second frequency resource (for example, $N_{len}^1$). At least one symbol index value and a plurality of first subcarrier index values may be allocated to the first signal chunk CK0, and the at least one symbol index value and a plurality of second subcarrier index values may be allocated to the second signal chunk CK1. For example, the first signal chunk CK0 and the second signal chunk CK1 may be generated based on one resource block with at least one symbol index value or a plurality of subcarriers. Hereinafter, according to the inventive concept, unless otherwise noted, the description will be made assuming each chunk is generated based on one resource block with at least one symbol index value.

The chunk generator 222 may generate the first signal chunk CK0 based on a first subcarrier index start value $N_{start}^0$ and a first subcarrier length value $N_{len}^0$, and the plurality of first subcarrier index values may be based on the first subcarrier index start value $N_{start}^0$ and the first subcarrier length value $N_{len}^0$. For example, when the first subcarrier index start value $N_{start}^0$ is a $0^{th}$ resource block $0^{th}$ RB, the first subcarrier length value $N_{len}^0$ is 135 resource blocks 135RB, and if the number of subcarrier index values included in one resource block is 12, the plurality of first subcarrier index values may be from 0 to 1619(=135*12). When the received pilot signal is PDSCH DMRS and a configuration of the PDSCH DMRS is 1, the number of pilots included in the first signal chunk CK0 may be 810 (=135*6). The chunk generator 222 may generate the second signal chunk CK1 based on a second subcarrier index start value $N_{start}^1$ and a second subcarrier length value $N_{len}^1$, and the plurality of second subcarrier index values may be based on the second subcarrier index start value $N_{start}^1$ and the second subcarrier length value $N_{len}^1$.

According to an embodiment of the inventive concept, in the plurality of first subcarrier index values and the plurality of second subcarrier index values, some index values may be the same and the other index values may be different from each other. For example, some of the frequency resources of the first signal chunk CK0 and the second signal chunk CK1 may overlap each other. For example, when the second subcarrier index start value $N_{start}^1$ is a $68^{th}$ resource block $68^{th}$ RB and the second subcarrier length value $N_{len}^1$ is 135 resource blocks 135RB, a frequency resource of an overlapping region may be from a $68^{th}$ resource block to a $135^{th}$ resource block. When the number of subcarrier index values included in one resource block is 12, the received pilot signal is the PDSCH DMRS, and the configuration of the PDSCH DMRS is 1, because 68 resource blocks correspond to an overlapped band, wherein pilot signals corresponding to 408=(6*68) subcarrier index values may overlap each other.

According to another embodiment of the inventive concept, the plurality of first subcarrier index values and the plurality of second subcarrier index values may include different index values. For example, the frequency resources of the first signal chunk CK0 and the second signal chunk CK1 may not overlap each other. For example, the pilot signals included in the first signal chunk CK0 and the second signal chunk CK1 may correspond to different subcarrier index values.

Figure 6:
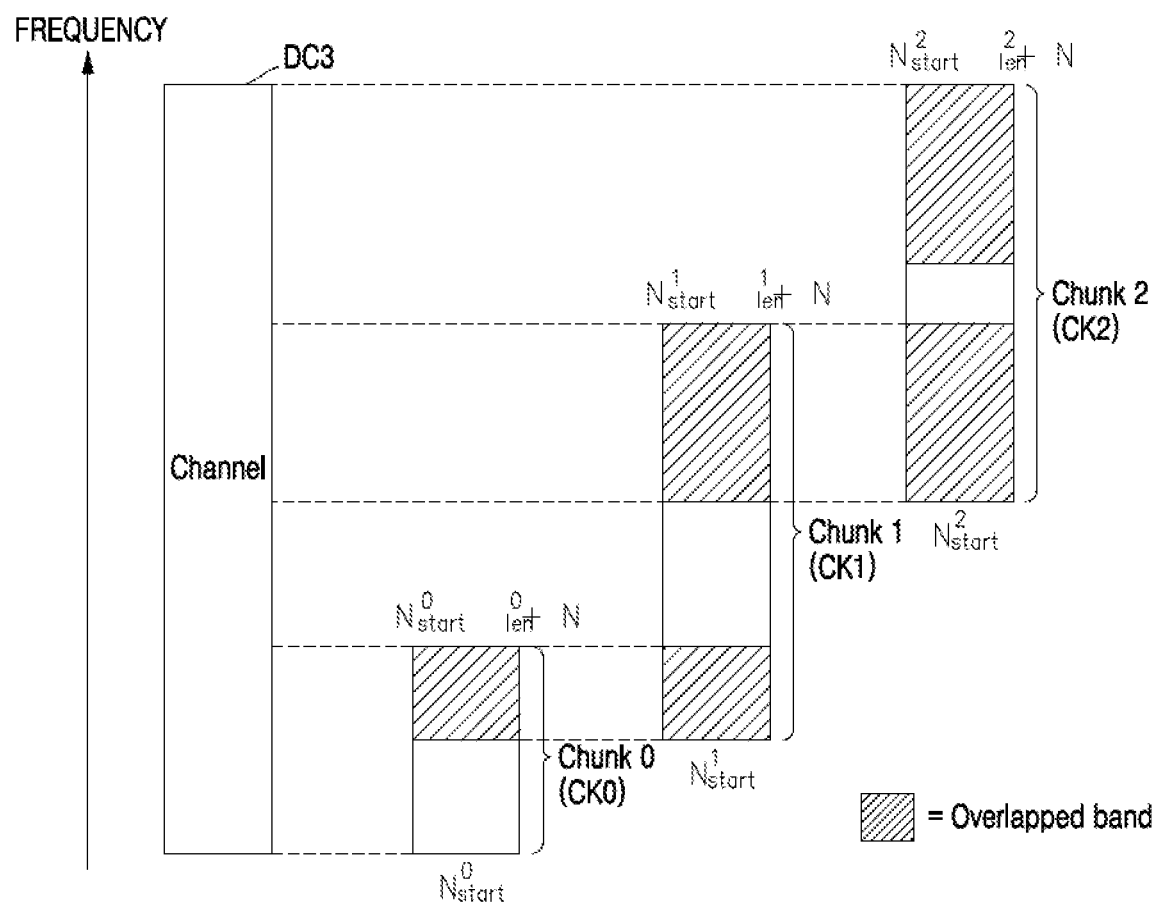
FIG. 6 illustrates an operation of a chunk generator according to an exemplary embodiment of the inventive concept.

FIG. 6 illustrates an operation of the chunk generator 222 according to an exemplary embodiment of the inventive concept.

Referring to FIGS. 4, 5, and 6, the chunk generator 222 may generate no less than three signal chunks CK0, CK1, and CK2. A method of generating the first to third signal chunks CK0, CK1, and CK2 is similar to that described above with reference to FIG. 5. For example, the chunk generator 222 may generate the first signal chunk CK0 based on a first subcarrier index start value $N_{start}^0$ and a first subcarrier length value $N_{len}^0$, may generate the second signal chunk CK1 based on a second subcarrier index start value $N_{start}^1$ and a second subcarrier length value $N_{len}^1$, and may generate the third signal chunks CK2 based on a third subcarrier index start value $N_{start}^2$ and a third subcarrier length value $N_{len}^2$. Additionally or alternatively, in FIGS. 5 and 6, the above-described values $N_{start}^0$, $N_{len}^0$, $N_{start}^1$, $N_{len}^1$, $N_{start}^2$, and $N_{len}^2$ are described in units of resource blocks. However, the above-described values $N_{start}^0$, $N_{len}^0$, $N_{start}^1$, $N_{len}^1$, $N_{start}^2$ and $N_{len}^2$ may be in units of resource elements (For example, in units of subcarrier indexes) and the inventive concept is not limited to the units of the above-described values. Additionally or alternatively, in FIGS. 5 and 6, the above-described values $N_{start}^0$, $N_{len}^0$, $N_{start}^1$, $N_{len}^1$, $N_{start}^2$, and $N_{len}^2$ may be stored in a storage unit of the terminal (20 of FIG. 1) and the channel estimator 22 may generate the first to third signal chunks CK0, CK1, and CK2 by loading the above-described values on volatile memory.

Figure 7:
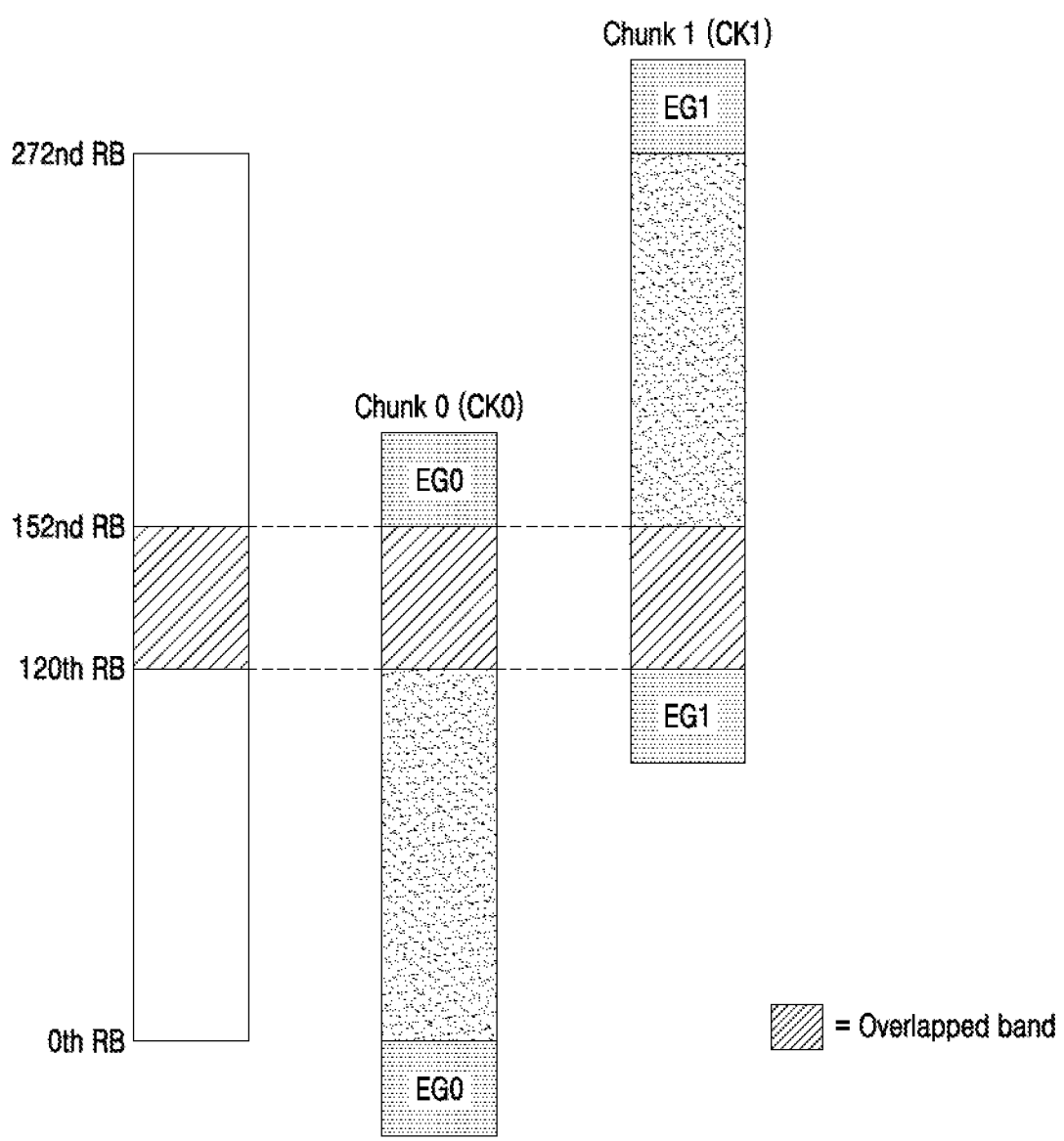
FIG. 7 illustrates an operation of a chunk generator according to an exemplary embodiment of the inventive concept.

FIG. 7 illustrates an edge processing operation according to an exemplary embodiment of the inventive concept.

Referring to FIGS. 4 and 7, the edge processing module 223 may insert a virtual pilot signal into first and second guard bands EG0 and EG1 of the first and second signal chunks CK0 and CK1. For example, the edge processing module 223 may generate the first guard band EG0 in a frequency resource not included in the pilot signal of the first signal chunk CK0. The first guard band EG0 may be adjacent to the first signal chunk CK0. The edge processing module 223 may insert virtual pilot signals into the first guard band EG0. The edge processing module 223 may generate the second guard band EG1 and may insert virtual pilot signals into the second guard band EG1. Because edge distortion may be caused at edge bands of the first and second signal chunks CK0 and CK1, the edge processing module 223 may reduce the edge distortion by inserting a virtual pilot signal into the first and second guard bands EG0 and EG1.

According to an exemplary embodiment of the inventive concept, the virtual pilot signal may be a pilot signal of a signal chunk adjacent to the signal chunk into which the virtual pilot signal is inserted. For example, the edge processing module 223 may insert a first virtual pilot signal into the first guard band EG0. The first guard band EG0 may be generated in a frequency resource adjacent to the first signal chunk CK0. Additionally or alternatively, the second signal chunk CK1 may be adjacent to the first signal chunk CK0 on a frequency axis. At this time, the first virtual pilot signal may be a pilot signal of the second signal chunk CK1. An entire guard band may be replaced by a pilot signal of a neighboring signal chunk. However, a part of the guard band may be replaced by the pilot signal of the neighboring signal chunk and the remaining guard band may generate a virtual pilot signal by using a conventional technique.

Referring to FIG. 4 again, the edge processing module 223 may output the signal chunk into which the virtual pilot signal is inserted, to the IFFT module 224, and the IFFT module 224 may transform the signal chunk into the time domain by performing an IFFT on the signal chunk. The PDP/NIV estimator 226 may estimate the PDP and NIV of the signal chunk transformed into the time domain by performing the IFFT before performing the denoising operation in the time domain.

The PDP as a function of time delay may be data representing an amplitude of a signal received by the terminal (20 of FIG. 1) through a multipath channel. The time delay may be a difference in time a signal arrives through the multichannel. NIV may mean a distribution of noise in the signal received by the terminal (20 of FIG. 1) by noise of a channel. Additionally or alternatively, the PDP and NIV may be data used for obtaining channel information and performing the denoising operation in the time domain.

Referring to FIGS. 4 and 7, the PDP/NIV estimator 226 may estimate NIV of each of the first signal chunk CK0 and the second signal chunk CK1 on which the IFFT is performed. For example, the PDP/NIV estimator 226 may estimate NIV of each of the first signal chunk CK0 and the second signal chunk CK1 in accordance with a predetermined algorithm. In another example, the PDP/NIV estimator 226 may estimate NIV of the first signal chunk CK0 to be the same as NIV of the second signal chunk CK1. In this case, after the PDP/NIV estimator 226 estimates NIV of the first signal chunk CK0, the PDP/NIV estimator 226 may estimate NIVs of the plurality of signal chunks to be the same by considering NIV of the first signal chunk CK0 as being the same as NIV of the second signal chunk CK1. For example, the estimated NIV of the first signal chunk CK0 may be the same as the estimated NIV of the second signal chunk CK1.

Additionally or alternatively, the PDP/NIV estimator 226 may estimate the PDP of each of the first signal chunk CK0 and the second signal chunk CK1 on which the IFFT is performed. For example, the PDP/NIV estimator 226 may estimate the PDP of each of the first signal chunk CK0 and the second signal chunk CK1 in accordance with a predetermined algorithm. In another example, the PDP/NIV estimator 226 may estimate the first signal chunk CK0 and the second signal chunk CK1 based on the same channel impulse response (CIR). By considering the first signal chunk CK0 and the second signal chunk CK1 to be calculated by the same CIR, the PDP/NIV estimator 226 may simultaneously estimate the PDP of each of the first signal chunk CK0 and the second signal chunk CK1 without respectively estimating the PDP of the first signal chunk CK0 and the PDP of the second signal chunk CK1.

The denoising module 225 may denoise the plurality of signal chunks in the time domain based on the estimated PDP and NIV. Based on the PDP and NIV estimated as described above, the denoising module 225 may denoise the plurality of signal chunks by using the denoising technique in the time domain of well-known various methods.

The FFT module 227 may transform the denoised first signal chunk CK0 from the time domain into the frequency domain by performing an FFT on the first signal chunk CK0. The FFT module 227 may transform the first signal chunk CK0 into the frequency domain and then, may store the first transformed signal chunk CK0 in the storage unit included in the terminal (20 of FIG. 1). The channel estimator 22 may perform the edge processing operation, the IFFT, the PDP/NIV estimating operation, the denoising operation, and the FFT on the second signal chunk CK1 to the final signal chunk (the Lth signal chunk). Additionally or alternatively, L is the integer greater than 1 and is the number of signal chunks obtained by dividing the descrambled pilot signal (for example, DC3 of FIG. 6).

Each of the IFFT transform module 224 and the FFT module 227 may have a predetermined transform size. For example, the transform size may be the number of tabs used for each of the IFFT and the FFT. For example, as the transform size increases, the chip size of each of the IFFT transform module 224 and the FFT module 227 may increase. However, according to an exemplary embodiment of the inventive concept, by dividing the descrambled pilot signal into the plurality of signal chunks each with a predetermined length and performing the IFFT and the FFT on the plurality of signal chunks, the chip size of each of the IFFT transform module 224 and the FFT module 227 may be reduced.

The post-processing module 228 may post-process a band in which the first and second signal chunks CK0 and CK1 overlap and may extract a value of the downlink channel (2 of FIG. 1) and/or the uplink channel (4 of FIG. 1) of the base station (10 of FIG. 1) and the terminal (20 of FIG. 1) by using the first and second post-processed signals CK0 and CK1, which will be described with reference to FIGS. 8A to 8C.

Figure 8A:
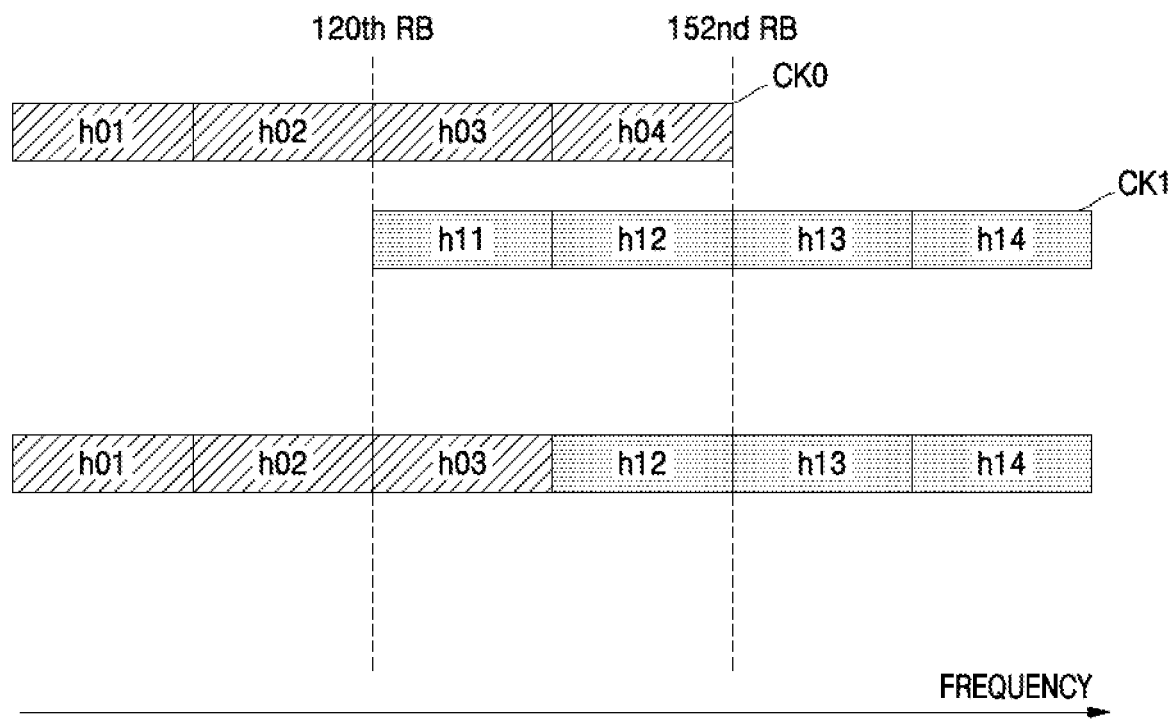
FIGS. 8A to 8C illustrate an edge processing operation according to an exemplary embodiment of the inventive concept.
Figure 8B:
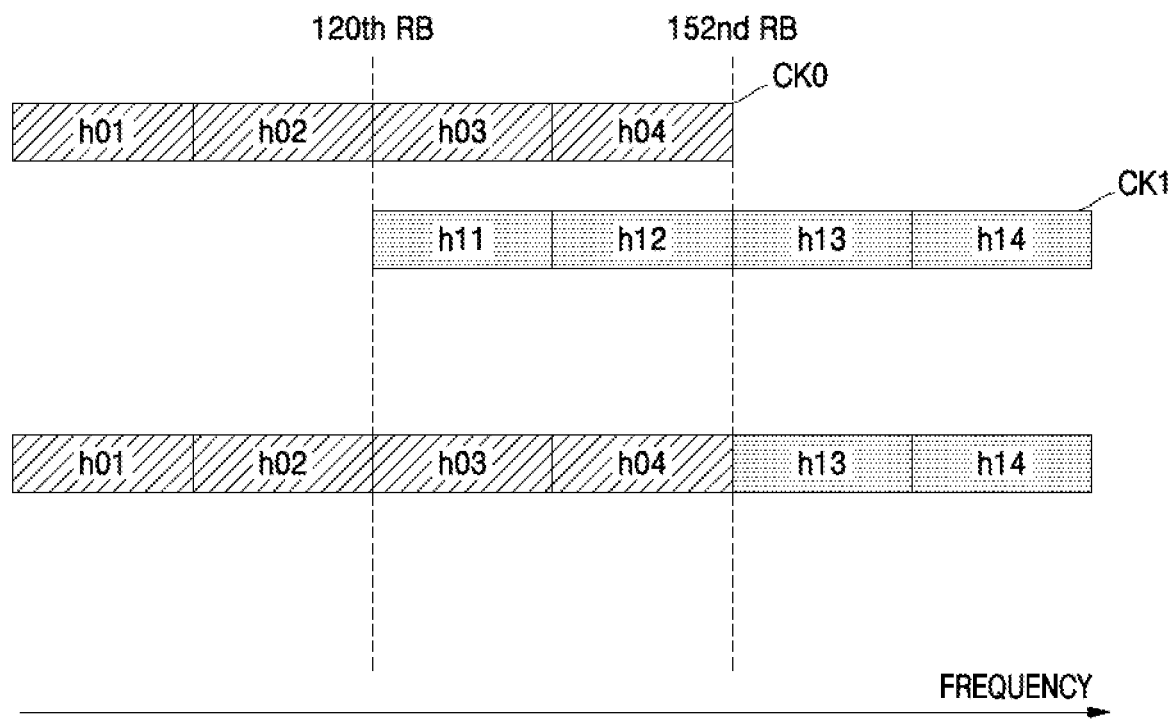
Figure 8C:
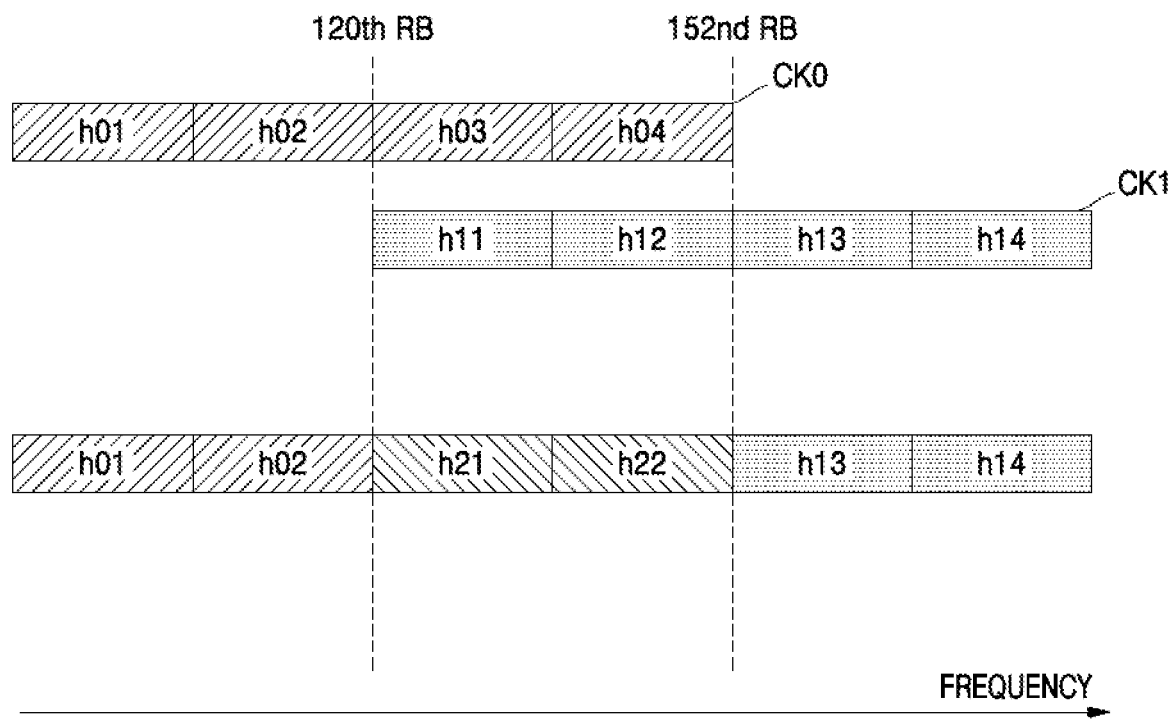

FIGS. 8A to 8C illustrate a post-processing operation and a channel value estimating operation according to an exemplary embodiment of the inventive concept.

Referring to FIGS. 4 and 8A to 8C, an overlapped band (for example, from a $120^{th}$ resource block to a $152^{nd}$ resource block) may exist between the first signal chunk CK0 and the second signal chunk CK1. The post-processing module 228 may post-process the overlapped band between the first signal chunk CK0 and the second signal chunk CK1. For example, the post-processing module 228 may estimate the value of the downlink channel (2 of FIG. 1) and/or the uplink channel (4 of FIG. 1) based on a channel value (for example, h03) of the first signal chunk CK0 and the second signal chunk CK1 of the overlapped band.

Referring to FIGS. 4 and 8A, the post-processing module 228 may perform an even type post-processing operation. The post-processing module 228 may estimate a channel value of a part of the overlapped band as the channel value h03 of the first signal chunk CK0 and may estimate a remaining channel value of the overlapped band as a channel value h12 of the second signal chunk CK1.

Referring to FIGS. 4 and 8B, the post-processing module 228 may perform an override type post-processing operation. The post-processing module 228 may estimate a channel value of the overlapped band as the channel value of the first signal chunk CK0 or the second signal chunk CK1. For example, the post-processing module 228 may estimate channel values of the overlapped band as channel values h03 and h04 of the first signal chunk CK0. In another example, the post-processing module 228 may estimate channel values of the overlapped band as channel values h11 and h12 of the second signal chunk CK1.

Referring to FIGS. 4 and 8C, the post-processing module 228 may perform an average type post-processing operation. The post-processing module 228 may estimate the channel value of the overlapped band as an average of the channel values of the first signal chunk CK0 and the second signal chunk CK1. For example, the post-processing module 228 may estimate a first channel value h21 of a first resource block of the overlapped band as an average of the channel value h03 of a first resource block of the first signal chunk CK0 and the channel value h11 of a first resource block of the second signal chunk CK1.

Additionally or alternatively, the overlapped frequency domain, from the $120^{th}$ resource block to the $152^{nd}$ resource block is an example for convenience sake and the inventive concept is not limited thereto. Additionally or alternatively, a unit of a frequency resource is not limited to a resource block and may be expressed as one of various units that may refer to a frequency.

Figure 9:
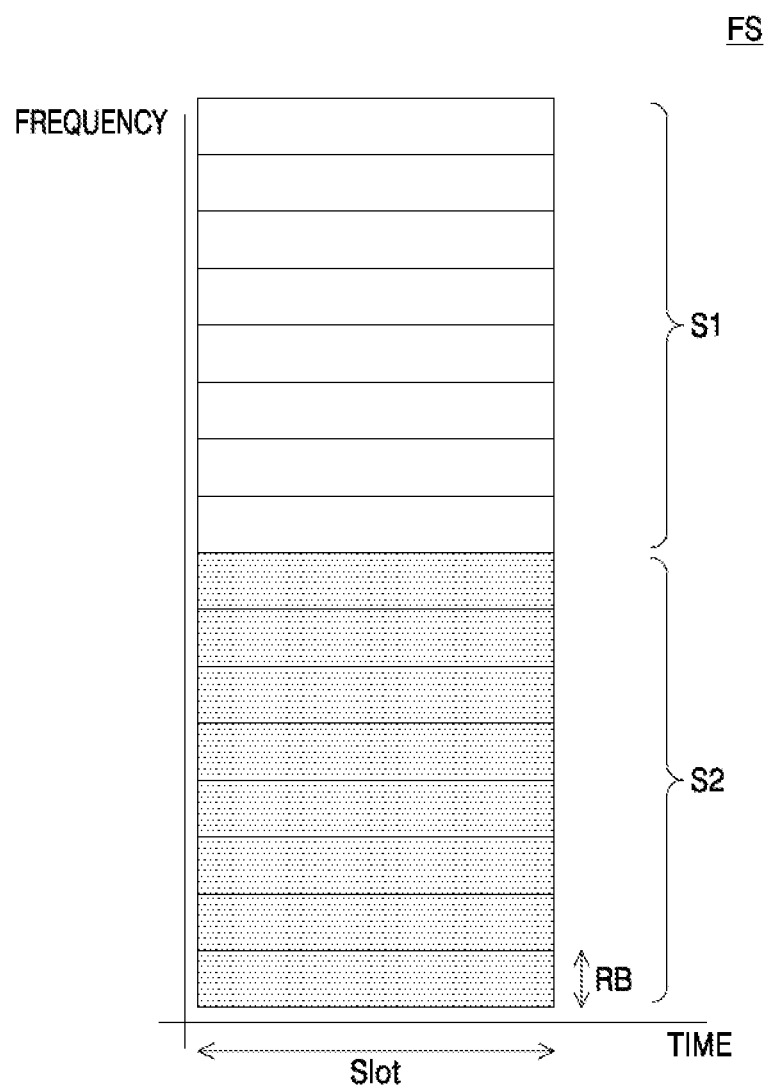
FIG. 9 illustrates a post-processing operation and a channel value estimation operation according to an exemplary embodiment of the inventive concept.

FIG. 9 illustrates signal chunks according to an exemplary embodiment of the inventive concept.

Referring to FIG. 9, according to FDM 2A of Multiple TRP of Rel. 16 of a 5G wireless communication standard, a first frequency signal S1 may be transmitted from a first transmission point (TRP) and a second frequency signal S2 may be transmitted from a second TRP. For example, the first frequency signal S1 may be PDSCH-transmitted from the first TRP and the second frequency signal S2 may be PDSCH-transmitted from the second TRP. For example, TRP may include the base station. Each of the first frequency signal S1 and the second frequency signal S2 may include a plurality of resource blocks RB on at least one slot.

According to a conventional method, the first frequency signal S1 and the second frequency signal S2 are transmitted from different TRPs. However, although the first frequency signal S1 and the second frequency signal S2 are to be collectively decoded, there is no detailed solution. However, according to an exemplary embodiment of the inventive concept, the channel estimator 22 may generate the first frequency signal S1 and the second frequency signal S2 as the above-described first signal chunk CK0 and second signal chunk CK1 and may collectively perform channel estimation based on the generated signal chunks CK0 and CK1.

Figure 10:
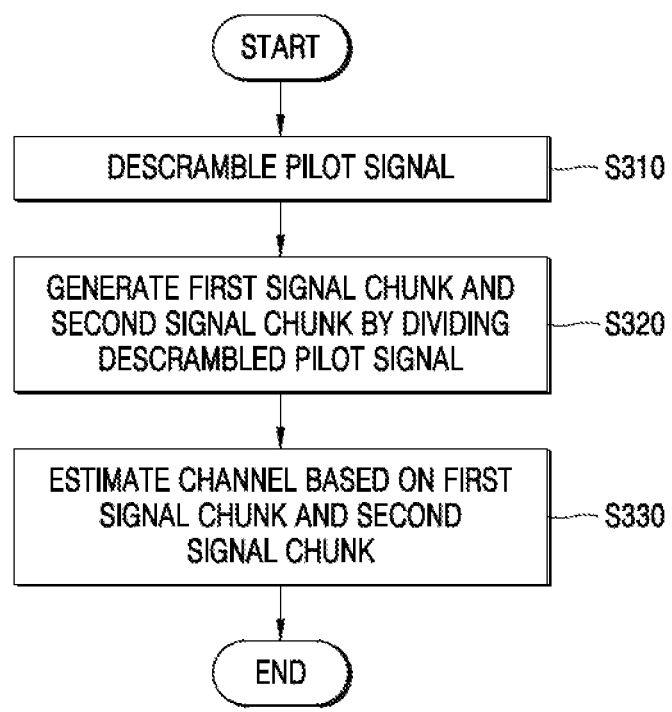
FIG. 10 is a flowchart illustrating a channel estimation method according to an exemplary embodiment of the inventive concept.

FIG. 10 is a flowchart illustrating a channel estimation method according to an exemplary embodiment of the inventive concept.

Referring to FIGS. 4 and 10, the channel estimator 22 may descramble a pilot signal with a unit symbol in operation S310. Because pilot signals may be apart from each other at predetermined intervals, the channel estimator 22 may perform a descramble operation to extract the pilot signals.

The channel estimator 22 may generate the first signal chunk with the first frequency resource and the second signal chunk with the second frequency resource by dividing the descrambled pilot signal into the plurality of frequency resources with the first frequency resource and the second frequency resource in operation S320. In this case, the at least one symbol index value and the plurality of first subcarrier index values may be allocated to the first signal chunk and the same symbol index value as that of the first signal chunk and the plurality of second subcarrier index values may be allocated to the second signal chunk. For example, at least parts of the plurality of first subcarrier index values and the plurality of second subcarrier index values may be the same. In another example, the plurality of first subcarrier index values and the plurality of second subcarrier index values may be different from each other.

The channel estimator 22 may estimate the value of the downlink channel (2 of FIG. 1) and/or the uplink channel (4 of FIG. 1) based on the first signal chunk and the second signal chunk in operation S330. For example, the channel estimator 22 may perform the even type, override type, or average type post-processing operation described above with reference to FIGS. 10A to 10C. Additionally or alternatively, the channel estimator 22 may estimate the value of the downlink channel (2 of FIG. 1) and/or the uplink channel (4 of FIG. 1) based on the post-processed signals.

Figure 11:
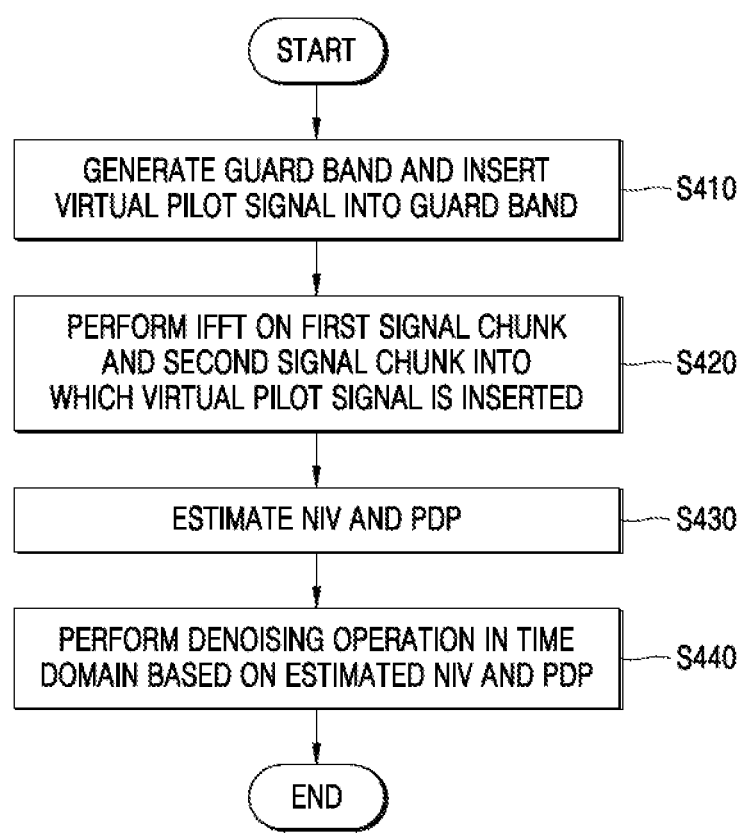
FIG. 11 is a flowchart illustrating a channel estimation method according to an exemplary embodiment of the inventive concept.

FIG. 11 is a flowchart illustrating a channel estimation method according to an exemplary embodiment of the inventive concept.

Referring to FIGS. 4 and 11, the channel estimator 22 may generate a guard band in a frequency resource adjacent to each of the first signal chunk and the second signal chunk. The channel estimator 22 may also insert a virtual pilot signal into the guard band in operation S410. A virtual pilot signal may be inserted into a neighboring band of each of the signal chunks to prevent or reduce a Gibbs phenomenon, by providing continuity to the edge bands of the first signal chunk and the second signal chunk. For example, the virtual pilot signal may be inserted to reduce or prevent the Gibbs phenomenon between the first signal chunk and the second signal chunk. As well known, the Gibbs phenomenon may mean that a function operated by Fourier series or a Fourier transformed function generates overshoot in a discontinuous period. The channel estimator 22 may perform the IFFT on the first signal chunk and the second signal chunk into each of which the virtual pilot signal is inserted in operation S420. In some examples, a first IFFT operation is performed on the first signal chunk and a second IFFT operation is performed on the second signal chunk.

The channel estimator 22 may estimate the NIV and PDP of each of the first signal chunk and the second signal chunk in operation S430. For example, the channel estimator 22 may estimate the NIV of the first signal chunk and may estimate one or more NIVs of the remaining signal chunks based on the estimated NIV. In another example, the channel estimator 22 may estimate the PDP of the first signal chunk and may estimate the PDPs of the remaining signal chunks based on the estimated PDP. The channel estimator 22 may perform the denoising operation in the time domain based on the estimated NIV and PDP in operation S440.

Figure 12:
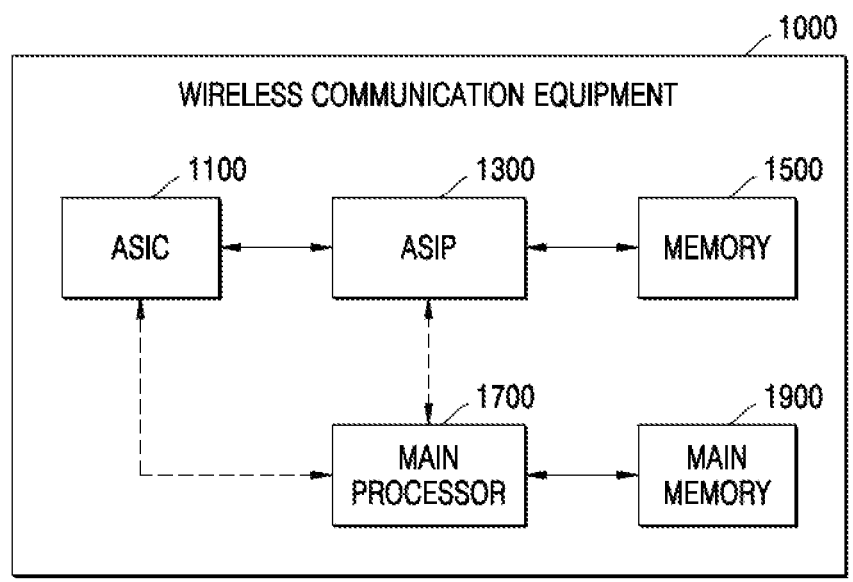
FIG. 12 is a block diagram illustrating a wireless communication device according to an exemplary embodiment of the inventive concept.

FIG. 12 is a block diagram illustrating a wireless communication equipment 1000 according to an exemplary embodiment of the inventive concept.

As illustrated in FIG. 12, the wireless communication equipment 1000 may include an application-specific integrated circuit (ASIC) 1100, an application-specific instruction-set processor (ASIP) 1300, a memory 1500, a main processor 1700, and a main memory 1900. At least two of the ASIC 1100, the ASIP 1300, and the main processor 1700 may communicate with each other. Additionally or alternatively, at least two of the ASIC 1100, the ASIP 1300, the memory 1500, the main processor 1700, and the main memory 1900 may be mounted in one chip.

The ASIC 1100 as an integrated circuit may be customized, for example, as a radio frequency integrated circuit (RFIC), a modulator, and a demodulator. The ASIP 1300 may support an exclusive instruction set for a specific application and may execute instructions included in the instruction set. The memory 1500 may communicate with the ASIP 1300 and may store a plurality of instructions executed by the ASIP 1300 in a non-temporary storage device. The memory 1500 may store data items generated in a process of the ASIP 1300 executing the plurality of instructions. For example, the memory 1500 may be random access memory (RAM), read-only memory (ROM), tape, a magnetic disk, an optical disk, volatile memory, non-volatile memory, or a combination of the above units. The memory 1500 may include any type of memory that may be accessed by the ASIP 1300.

The main processor 1700 may control the wireless communication equipment 1000 by executing the plurality of instructions. For example, the main processor 1700 may control the ASIC 1100 and the ASIP 1300 and may process data received through a wireless communication network or a user input to the wireless communication equipment 1000. The main memory 1900 may communicate with the main processor 1700 and may store the plurality of instructions executed by the main processor 1700 as a non-temporary storage device. For example, the main memory 1900 may be any type of memory that may be accessed by the main processor 1700 like the RAM, the ROM, the tape, the magnetic disk, the optical disk, the volatile memory, the non-volatile memory, or the combination of the above units. For example, at least one of the methods according to an exemplary embodiment of the inventive concept may be implemented by a program instruction that may be executed by one of various computer units and may be recorded in a non-temporary computer-readable medium.

A component of the above-described wireless communication device according to the exemplary embodiment of the inventive concept (for example, the terminal 20 of FIG. 1) or operation configuring the channel estimation method may be included in at least one of the components included in the wireless communication equipment 1000 of FIG. 12. For example, the channel estimator 22 of FIG. 1 may be implemented by the plurality of instructions stored in the memory 1500. In an example embodiment, at least one of operations of the channel estimation method of FIGS. 10 and 11 may be implemented by the plurality of instructions stored in the memory 1500.

By the ASIP 1300 executing the plurality of instructions stored in the memory 1500, at least one operation of the channel estimator 22 may be performed. In another example, the channel estimator 22 or at least one of the operations of the channel estimation method may be implemented by a hardware block and may be included in the ASIC 1100. Additionally or alternatively, in another example, the channel estimator 22 of FIG. 5 or at least one of the operations of the channel estimation method may be implemented by the plurality of instructions stored in the main memory 1900. Additionally or alternatively, the channel estimator 22 or at least one of the operations of the channel estimation method may be performed by the main processor 1700 executing the plurality of instructions stored in the main memory 1900.

While the inventive concept has been particularly shown and described with reference to embodiments thereof, it will be understood that various changes in form and details may be made therein without departing from the spirit and scope of the following claims.

What is claimed is:

1. A channel estimation method of a wireless communication device, the method comprising:
descrambling a pilot signal;
dividing the descrambled pilot signal into a plurality of frequency resources including a first frequency resource and a second frequency resource;
generating a first signal chunk including the first frequency resource and a second signal chunk including the second frequency resource; and
estimating a channel value of the wireless communication device based on the first signal chunk and the second signal chunk,
wherein, the first signal chunk includes at least one symbol index value and a plurality of first subcarrier index values and the second signal chunk includes the at least one symbol index value and a plurality of second subcarrier index values.

2. The channel estimation method of claim 1, wherein some of the plurality of first subcarrier index values and the plurality of second subcarrier index values are the same and others of the plurality of first subcarrier index values and the plurality of second subcarrier index values are different from each other.

3. The channel estimation method of claim 1, wherein the plurality of first subcarrier index values and the plurality of second subcarrier index values comprise different index values.

4. The channel estimation method of claim 1, wherein a first subcarrier index start value and a first subcarrier length value are allocated to the first signal chunk,
wherein the plurality of first subcarrier index values are based on the first subcarrier index start value and the first subcarrier length value, wherein a second subcarrier index start value and a second subcarrier length value are allocated to the second signal chunk, and wherein the plurality of second subcarrier index values are based on the second subcarrier index start value and the second subcarrier length value.

5. The channel estimation method of claim 1, further comprising:

generating a guard band in a frequency resource adjacent to each of the first signal chunk and the second signal chunk and inserting a virtual pilot signal into the guard band; and performing an inverse fast Fourier transform (IFFT) on the first signal chunk and the second signal chunk into which the virtual pilot signal is inserted.

6. The channel estimation method of claim 5, wherein the inserting of the virtual pilot signal into the guard band further comprises:

generating a first guard band in a frequency resource adjacent to the first signal chunk; and inserting a pilot signal of the second signal chunk into the first guard band as the virtual pilot signal.

7. The channel estimation method of claim 5, wherein the virtual pilot signal is configured to reduce or prevent a Gibbs phenomenon between the first signal chunk and the second signal chunk.

8. The channel estimation method of claim 5, further comprising:

estimating noise invariance (NIV) and a power delay profile (PDP) of each of the first signal chunk and the second signal chunk on which the IFFT is performed; and performing a denoising operation based on the estimated NIV and PDP.

9. The channel estimation method of claim 8, wherein the estimated NIVs of the first signal chunk and the second signal chunk are the same.

10. The channel estimation method of claim 8, wherein the PDPs of the first signal chunk and the second signal chunk are estimated based on the same channel impulse response.

11. The channel estimation method of claim 1, wherein, in the estimating of the channel based on the first signal chunk and the second signal chunk, channel estimation is performed when an overlapped band exists in which at least some of the first frequency resource of the first signal chunk and the second frequency resource of the second signal chunk overlap, based on at least one channel value of the first signal chunk and the second signal chunk of the overlapped band.

12. The channel estimation method of claim 11, wherein a channel value of a part of the overlapped band is estimated as a channel value of the first signal chunk and a channel value of a remaining part of the overlapped band is estimated as a channel value of the second signal chunk.

13. The channel estimation method of claim 11, wherein a channel value of the overlapped band is estimated as a channel value of the first signal chunk or the second signal chunk.

14. The channel estimation method of claim 11, wherein a channel value of the overlapped band is estimated as an average of a channel value of the first signal chunk and a channel value of the second signal chunk.

15. A wireless communication device comprising a channel estimator, wherein the channel estimator is configured to:

divide a pilot signal received through a downlink channel into a plurality of frequency resources;

generate a plurality of signal chunks including the plurality of frequency resources; and estimate a channel between a base station and a terminal based on the plurality of signal chunks, wherein the channel estimator estimates noise invariance (NIV) and a power delay profile (PDP) based on each of the plurality of signal chunks.

16. The wireless communication device of claim 15, wherein each of the plurality of signal chunks comprises at least one symbol index value and has a plurality of different subcarrier index values allocated.

17. The wireless communication device of claim 15, wherein the plurality of signal chunks comprise a first signal chunk, and wherein the channel estimator estimates an NIV or an PDP of the first signal chunk and then, estimates NIVs or PDPs of remaining signal chunks excluding the first signal chunk.

18. A wireless communication device performing channel estimation, the wireless communication device comprising a channel estimator configured to:

descramble a pilot signal;

divide the descrambled pilot signal into a plurality of frequency resources including a first frequency resource and a second frequency resource;

generate a first signal chunk including the first frequency resource and a second signal chunk including the second frequency resource; and estimate a channel value of the wireless communication device based on the first signal chunk and the second signal chunk, wherein, the first signal chunk includes at least one symbol index value and a plurality of first subcarrier index values and the second signal chunk includes the at least one symbol index value and a plurality of second subcarrier index values.

* * * * *